July 31, 1956

E. B. McGEE 2,756,929

NAVIGATION COMPUTING INSTRUMENT

Filed Jan. 23, 1952

INVENTOR.
*Elbert B. McGee,*

BY *Victor J. Evans & Co.*

ATTORNEYS

July 31, 1956  E. B. McGEE  2,756,929
NAVIGATION COMPUTING INSTRUMENT
Filed Jan. 23, 1952  5 Sheets-Sheet 2

INVENTOR.
Elbert B. McGee,
BY Victor J. Evans & Co.
ATTORNEYS

July 31, 1956  E. B. McGEE  2,756,929
NAVIGATION COMPUTING INSTRUMENT
Filed Jan. 23, 1952  5 Sheets-Sheet 3
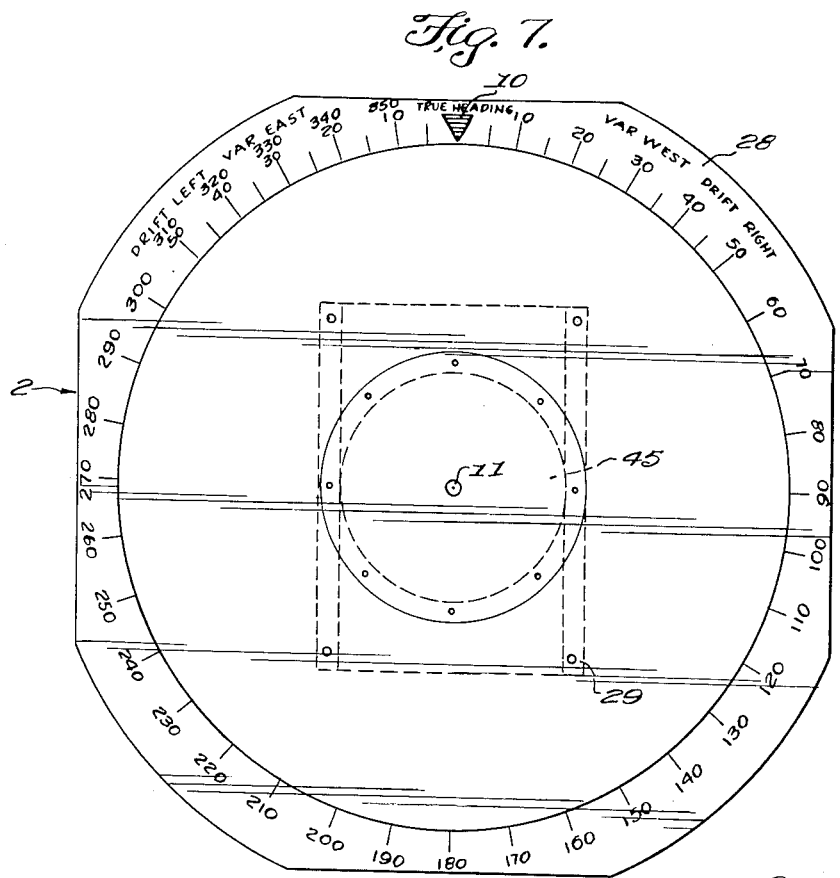
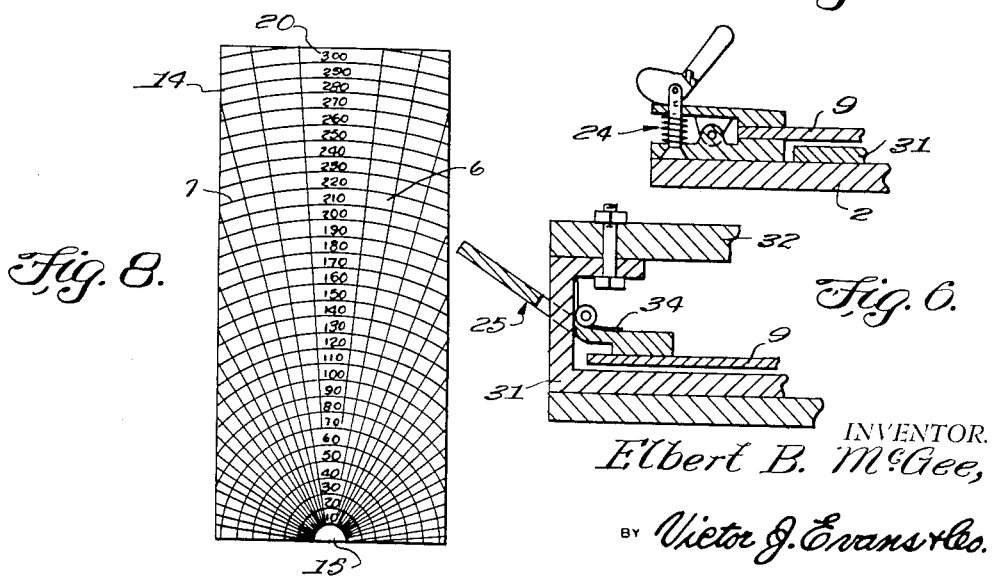
INVENTOR.
*Elbert B. McGee,*
BY *Victor J. Evans & Co.*
ATTORNEYS July 31, 1956  E. B. McGEE  2,756,929
NAVIGATION COMPUTING INSTRUMENT
Filed Jan. 23, 1952  5 Sheets-Sheet 4

INVENTOR.
*Elbert B. McGee,*
BY *Victor J. Evans & Co.*
ATTORNEYS

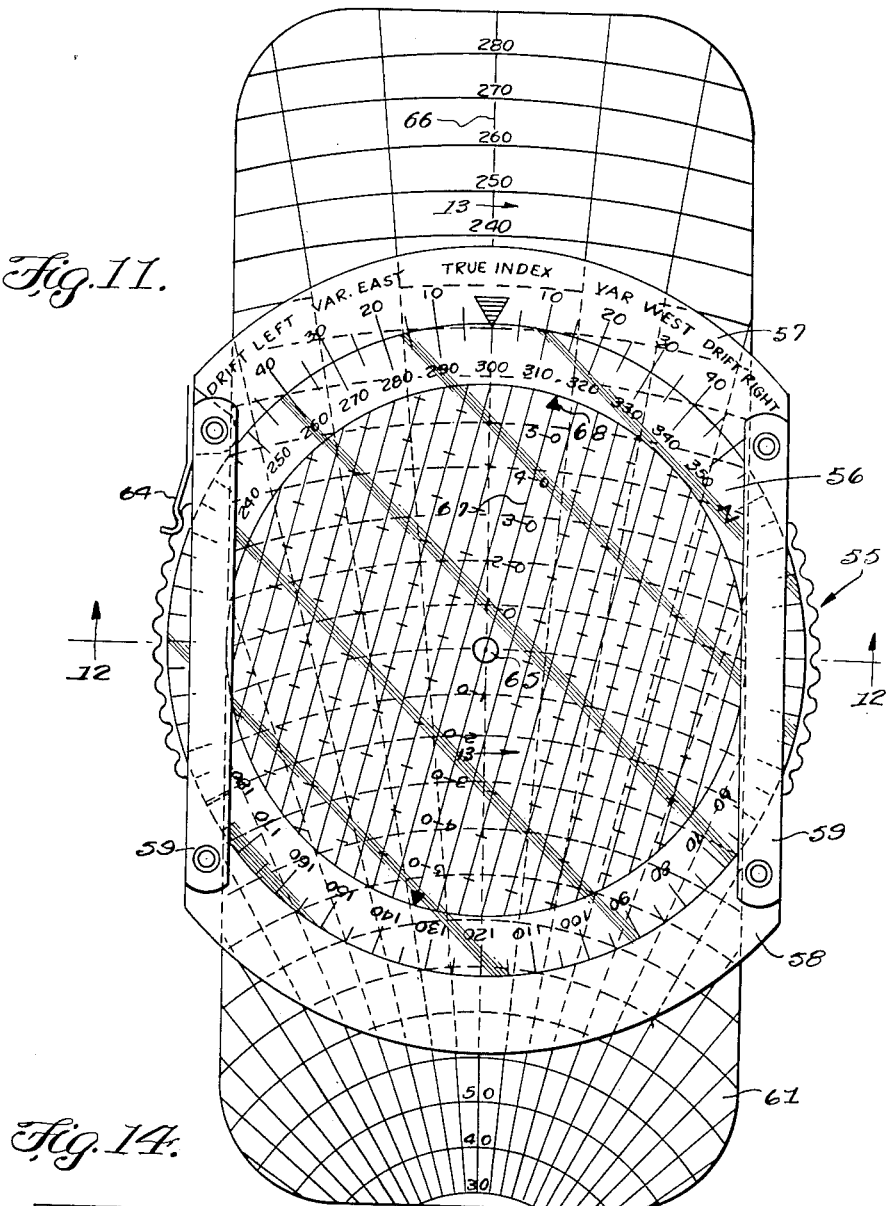

United States Patent Office 2,756,929
Patented July 31, 1956

2,756,929

NAVIGATION COMPUTING INSTRUMENT

Elbert B. McGee, Fair Oaks, Calif.

Application January 23, 1952, Serial No. 267,753

1 Claim. (Cl. 235—61)

This invention relates to a navigation instrument, and more particularly to a navigation instrument for use by airmen in accurately directing aircraft from one place to another.

The object of the invention is to provide a navigating computing instrument which will enable pilots or other persons to safely fly to a desired location in bad weather and in the hours of darkness, when the usual landmarks are often lost to view, the invention furnishing the pilot with continuous indications of distance and direction.

Still another object of the invention is to provide a navigation instrument and method of using same which will enable a pilot to fly the plane by dead reckoning, the present invention including a means for quickly determining the wind triangle, so that by easy adjustment the desired data may be determined by inspection, and wherein track and ground speed can also be determined, as well as true heading, off-course corrections, drift, radio compass fixes and various other calculations.

Yet another object of the invention is to provide a navigation instrument which, while especially designed for aircraft navigation, can also be used for surface navigation, and wherein, in one form of the invention, a kit is provided for converting the existing computers to be used by the method of the present invention.

Another object of the invention is to provide a navigation instrument which embodies the method of computing velocity triangles by paralleling a group of parallel lines, a group of radiating lines and concentric circles by means of a plotted wind vector on and in relation to a compass rose, the present invention being easy and quick to operate and having provision for ready computation of drift angles and compass variations, as well as computing speed velocity triangles, the instrument of the present invention adapted to use any standard chart, the data obtained being readily applied to a plotting table or chart, said instrument operating from true air speed and altitude settings, and wherein the instrument is fast, flexible, accurate and compact enough to be used in high-speed aircraft.

Other objects and advantages will be apparent during the course of the following description.

In the accompanying drawings forming a part of this application, and in which like numerals are used to designate like parts throughout the same:

Figure 1 is a top plan view of the navigation instrument constructed according to the present invention;

Figure 5 is a sectional view taken on the line 5—5 of Figure 1;

Figure 6 is a fragmentary sectional view showing certain construction details of the assembly;

Figure 7 is a plan view of the transparent disc;

Figure 8 is a plan view of the sliding speed scale;

Figure 11 is a plan view of a modified computer;

Figure 12 is a sectional view taken on the line 12—12 of Figure 11;

Figure 13 is a sectional view taken on the line 13—13 of Figure 11;

Figure 14 is an elevational view of one of the locking members.

Figure 2:
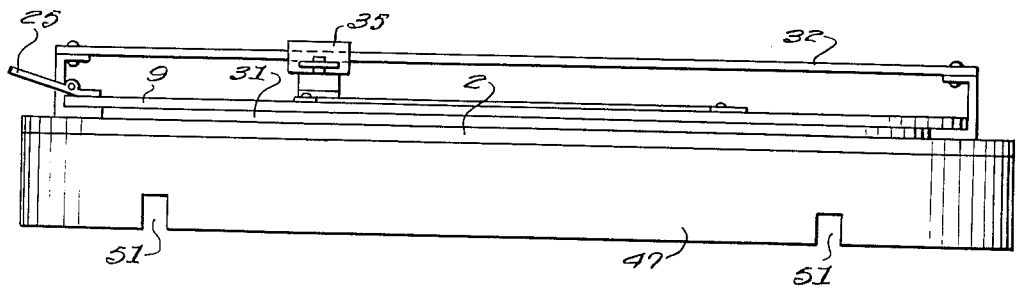
Figure 2 is a side elevational view of the instrument.

Referring in detail to Figures 1 through 10 of the drawings, there is shown a navigation instrument which includes a base 2 and attached to the base 2 is a transparent disc 45. A heading indicator scale 28 is graduated and indexed on the face of the base 2 around the outside circumference of the plotting table 9. The heading scale 28 is graduated and indexed to 360° of the compass clockwise and at least 45° anticlockwise from the true heading indicator 10, Figure 7.

Arranged on the rear of the base 2 is a guide member 29, the guide member 29 being secured to the base 2 in any suitable manner. A speed scale 4 is slidably mounted in the guide member 29, and suitable spring clips may be provided for maintaining the scale 4 in alignment and immobile in various adjusted positions in the guide member 29. The speed scale in the guide member 29 is arranged so that when the speed scale 4 is in place, the central speed scale 20, Figure 8, is directly beneath the center 11.

Figure 9:
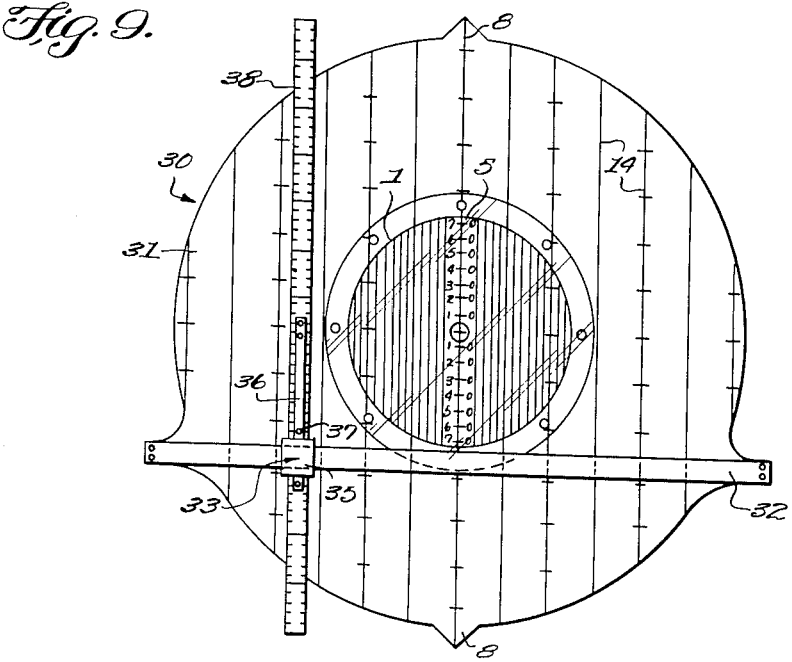
Figure 9 is a plan view of the true plotting assembly.

The instrument of the present invention further includes a true plotting assembly 30, Figure 9, which is arranged on top of the base 2. The true plotting assembly 30 includes a course indicator paralleling disc 1 to which is attached a true plotting plate 31. Mounted on the plate 31 is a cross bar 32, and arranged on the bar 32 is a sliding true plotting scale assembly 33.

A course lock 25 is attached to the plate 31, and the lock 25 is maintained closed or in locked position by means of a spring 34, Figure 6. The lock 25 is attached to the plate 31, and the lock 25 serves to lock the plotting assembly 30 to the plotting table 9.

The true plotting plate 31 is provided with a plurality of spaced, parallel lines 14 which are arranged in parallel relation with respect to a group of parallel lines 3 that are arranged on the course indicator disc 1. The lines 14 are spaced and graduated to the scale that is standard to the navigation map. By providing the lines 14 across the face of the plate 31, the operator will be able to remove the scale assembly 33 and plot directly on the surface of the plotting table 9, using the plotting lines 14 as a reference.

The plotting scale assembly 33 comprises a saddle 35 which is placed on a cross slide bar 32. A spring arm 36 extends slidably through slots in the saddle 35 to pin the saddle 35 to the bar 32. A pair of stop pins 37 are provided, and these stop pins 37 are arranged in spaced relation on the spring arm 36 to permit some movement of the plotting scale 38. The plotting scale 38 is attached to the spring arm 36. In constructing the computer, the saddle 35, bar 32 and spring arm 36 are machined to a very close fit in order to insure that the plotting scale 38 will always be arranged 90° to the bar 32 and parallel to the lines 3 of the course paralleling disc 1.

The plotting scale 38 is a straight edge which is graduated with the scale 39. The scale 39 is indexed to the same scale as the map being used for navigating. The scale 39 has longer identification marks every five units, Figure 9, and by being able to move the scale 38 between the stop pins 37 at least five units, it is always possible to start measurement of track or course from a long identification mark, thus making it possible to count off in five-tenths. The spring arm 36 is adapted to hold the plotting scale 38 just clear of the top of the plotting table or chart, so that if the operator wishes to make an accurate measurement at any time, he need only push the plotting scale down on the chart.

The course indicator paralleling disc 1, Figure 9, is installed in the indicator plate 31, and the disc 1 is a transparent disc provided with parallel lines 3. The lines 3 are spaced to scale of units, and the center line 5 of the disc 1 is graduated and indexed at the same scale of the units, which is the same scale of units that is used on the sliding speed scale 4. Arranged contiguous to each end of the center line 5 are indicator points or arrows 8 which always correspond to the compass rose 40 as true course or track.

Arranged on the assembly 30 is the plotting table 9, and the plotting table 9 and assembly 30 are attached to and maintained centered on the base 2 by means of a hollow countersunk rivet 43.

Figure 10:
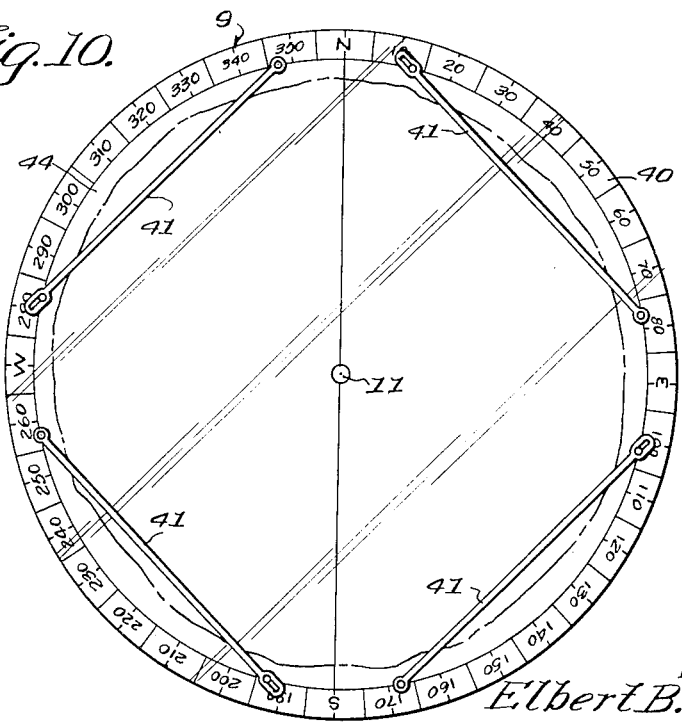
Figure 10 is a plan view of the plotting table.

The plotting table 9 is a transparent disc that is provided with a compass rose 40 which is graduated to 360° of the compass around its outside circumference, Figure 10.

A plurality of spring map holder clips 41 are arranged on the face of the plotting table 9, and the clips 41 are mounted so that they leave a clear space 44 between the map and compass rose 40 through which the true course is read at the top indicator point 8.

Figure 3:
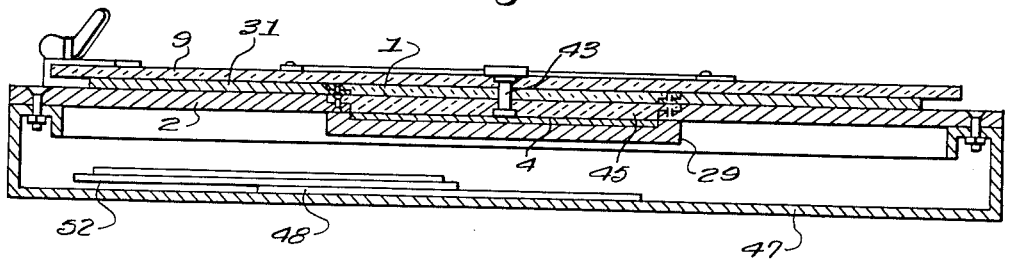
Figure 3 is a sectional view taken on the line 3—3 of Figure 1.
Figure 4:
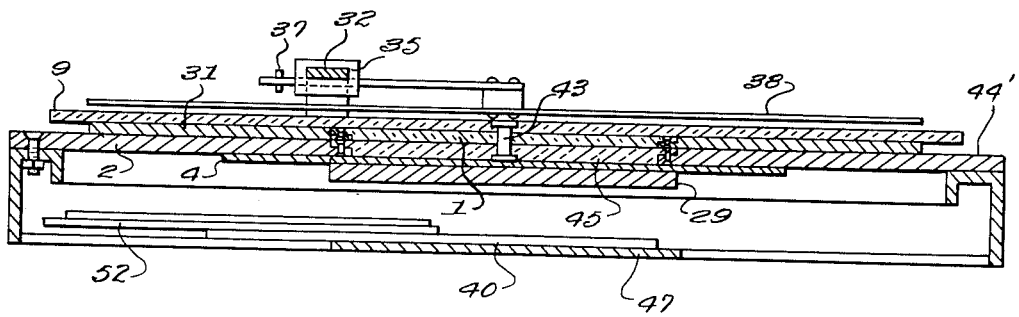
Figure 4 is a sectional view taken on the line 4—4 of Figure 1.

The hollow countersunk rivet 43 is countersunk into the base 2 and is flush with the bottom of the base, Figures 3 and 4, in order not to interfere with the sliding speed scale 4. The top end of the rivet 43 is also countersunk to provide a smooth top for plotting or placing of maps on the plotting table 9. The rivet 43 is hollow to insure accuracy of reading and setting of air speeds under the center 11. The heading lock 24, Figure 5, is connected to the base 2 at the head of the heading indicator scale 28. This lock 24 is used for locking the plotting table 9 to the base 2 in reference to the heading indicator 10.

The sliding speed scale 4, Figure 8, consists of a center line 20 which runs the full length of the scale, and the center line 20 starts from a common center 15. A plurality of lines 6 run lengthwise from the center line 20 to the degrees of the compass. From the common center 15 a plurality of concentric circles 7 radiate out the length of the sliding scale 4, and the circles 7 are graduated and indexed along the center line 20 to a scale of units. This scale always represents speed. The air speed is always read along the center line 20. The ground speed is read in concentric circles 7 in reference to the center scale 20. The sliding speed scale 4 is installed in the guide member 29 which is arranged in the base 2 adjacent the rear thereof, so that by manipulating the sliding speed scale 4, any desired air speed can be set up under the center 11.

There is further provided a mounting base 47 which adds support to the complete instrument. Thus, all of the disc units and the base 2 are preferably manufactured from material that is very thin, in order to eliminate possible error when viewing from an angle or when reading speed scales and paralleling lines in reference to the tail of the wind vector. Also, the instrument may be placed on a suitable bracket which can be attached to either side of a cockpit, so that the instrument is over the pilot's lap and high enough to clear the control stick and throttle, and also close enough to the pilot's chest that he can see over it to read his instrument. With the navigating instrument of the present invention mounted in this manner, the pilot will be able to operate the instrument fast and accurately with one hand. Slots 51 may be arranged on each side of the mounting base 47, whereby the instrument can be hung from a suitable hook, and also the instrument can be carried in a case out of the way when not being used. Attached to the mounting base 47 is an arm 48, and any standard make or conventional circular slide rule may be connected to the arm 48. The slide rule connected to the arm 48 may be used for making time and distance calculations, as well as other calculations.

The instrument of the present invention is flexible, since the plotting table 9 and true plotting assembly 30 can be built in any size from a small, compact instrument, to be used in aircraft, to a large table size, to be used in plotting centers, and in any event a standard size speed scale 4 and course indicator, paralleling disc 1 is used. The instrument is simple to manufacture, easy to operate, accurate, easy to maintain, and flexible. The chart is maintained on the plotting table by means of spring clips 41, and it will be seen from Figure 10 that the clips 41 are provided with slots on one end thereof to allow movement for the spring clips, so that the clips can be raised to permit a standard navigation map to be placed thereon. The map may be folded in such a manner that any leg of flight can be exposed at will.

From the foregoing, it is apparent that a navigation instrument has been provided wherein a chart is placed on the plotting table 9 so that the line of meridian that is being used as reference leg of a course is parallel to the north south line of the plotting table 9. This is accomplished in the following manner: First, the lock 25 is released, and then the heading lock 24 is released. Next, rotate table 9 until the table heads north which is read at the heading indicator 10. Next, the lock 24 is locked, and the plotting assembly 30 is centered to north, which is also read at the course indicator plate 28. Then, the lock 25 is locked and the chart is placed on the plotting table with the north of the map in alignment with the north of the plotting table 9, the edges of the chart being placed under the spring clips 41. The chart may be any standard aeronautical chart, and it may be folded so that its corners will come within the circumference of the plotting table and any part of the intended course can be exposed at will. Next, the plotting scale 38 is slid over the chart on the cross slide bar 32 until the scale 38 is alongside the line of meridian that is to be used as a reference. The chart is manipulated around under the spring clips 41 until the line of meridian is parallel to the plotting table. It is recommended that the operator make reference marks at north and south edges of the chart over north-south line 46 of the plotting table 9. These are used to re-line the chart when the chart is disturbed, and also to read the computing unit and speed scale. Now, it will be seen that if the heading lock 24 and the course lock 25 are released and the plotting table revolved, by moving scale 38, it will be possible to azimuth and measure the direction and distance between any two points at the exposed portion of the chart. Azimuth is read at the course indicator 8 and compass rose 40.

The method of aazimuthing and measuring a course in comparison to the lines of longitude of a chart is very precise and it is possible to use charts which are condensed and scaled to cover large areas. Thus a jet pilot flying at high speed at a high altitude would not be as interested in detail as in landmarks, such as towns, mountain peaks, rivers, lakes, airway beacons, and radio stations; in other words, landmarks that can be readily identified by quick fixes. Thus, by using maps that are condensed in scale to cover large areas, it is possible for the pilot at all times to have an over-all picture and be able to visualize his relation to the surrounding area and intended course. By using a series of these maps, such as strip maps, almost any situation can be coped with. For detail, the pilot can always refer to the standard aeronautical charts. In aircraft, where the space is not so limited, the plotting table can be made larger in order that larger areas of the charts can be exposed at any one time.

Using the foregoing method of placing the chart on the rotatably plotting table, it is a simple matter to plot radio compass bearings to the chart, where the exposed portion of the chart has one or more radio stations that are in receiving distance of the aircraft. Radio compass bearings are always set and read on the 360° compass rose of the heading index scale 28 in relation to either course indicator point 8, at the same time that the plotting table is set and locked to read the true heading of the aircraft. An example of this feature is as follows: Release heading lock 24, rotate plotting table to read true heading of aircraft at true heading indicator 10, and the compass rose 40. Lock heading lock. Release course lock 25, rotate plotting scale 38 to read the radio compass bearing on the heading scale 28 and indicator point 8, lock course lock. Slide the plotting scale 38 on the bar 32 over the radio station that the bearing was taken from, draw line along scale, this being the true bearing line. By taking a bearing from two or more stations and plotting them in the same manner, the intersection of the plotted lines is the true fix of the craft at the time the bearings were taken. It is apparent that this feature of this instrument simplifies, speeds up and removes the confusion of plotting to a chart radio compass or directional loop bearings taken from a moving craft.

When setting up the wind vector, a common procedure is to use the center line 5 of the course indicator paralleling disc 1, and then rotating the plotting table until the direction from which the wind is blowing is aligned with either course indicator point 8. Then, the wind is plotted from the center 11, always outward and away from the indicator point 8 being used to the number of units of wind velocity. True headings, magnetic headings corrected for variations, and drift angles are always read on the heading scale 28. True air speeds are always read and set on the center speed scale 20 under the center 11. Ground speeds are always read in concentric circles 7 with reference to the scale 20 under the tail of the wind vector. Whenever it is necessary to plot the wind, read the air speed, ground speed or parallel lines under the tail of the wind vector it is necessary to look under the chart. This is accomplished by sliding the scale 38 clear of the chart, removing one side of the chart from under spring clips 41 and folding it back.

Many different types of problems can be solved by the instrument of the present invention. As an example of a type of problem that can be solved with the instrument, assume that the wind direction and force, true air speed, time and intended course are known. Then, with this information, the pilot or other person can ascertain true heading, ground speed and plot the aircraft on course. This problem is solved as follows: First, the heading lock 24 and course lock 25 are released, then the plotting table 9 is rotated until the point 8 is aligned to read the wind direction. Next, the wind vector is plotted from the center 11 out along the center scale 5 to determine the proper length and the speed scale is set to read true air speed under the center 11. The map is placed on the plotting table so that the line of meridian, which is in center of the intended course leg, is parallel to the center line 46 of the plotting table 9. The table 9 is rotated and the scale manipulated until exactly parallel and alongside of the intended course. The course lock 25 is next locked and the plotting table and the plotting scale are rotated in unison in the required direction until the parallel line 3 of the course indicator disc 1, which is under the tail of the wind vector is parallel to the only drift angle 6 that it is possible to parallel. Next, the lock 24 is locked and the true heading is read at the heading indicator 10. The magnetic heading is read on the heading index plate 28 in relation to the variations, and the ground speed is read under the tail of the wind vector. The time and ground speed are computed to the distance using the slide rule on the arm 48, and the progress on the course is plotted alongside the plotting scale 38.

As another example of a problem that can be worked, assume that the wind direction and velocity, true air speed, time and magnetic heading are known. Then, to solve for true ground speed, true course and progress on chart, the heading lock 24 and course lock 25 are released, and the direction from which wind is blowing is set at course indicator 8. Then, the wind vector from center 11 is plotted out along the center scale 5 to determine the proper length, and the true air speed is set at center 11. The magnetic heading is set to variation index 28, and the heading lock 24 is locked. Next, the scale known as the plotting scale is rotated in the required direction to parallel the line 3 to the drift angle line 6 that is under the tail of the wind vector, and the course lock 25 is locked. The true ground speed is read under the tail of the vector, and time, ground speed and distance are computed. Next, slide the course plotting scale over to the position of the last fix and plot the progress on the chart. In the above two problems, it will be seen that the calculations are made so simply and are applied to the chart so rapidly that the operator can at all times realize his true relation to any spot on the exposed portion of the chart.

As an example in solving an off-course problem, if in flying one of the above problems, the pilot finds, or thinks, that he is off course, the procedure is as follows: With the magnetic heading, true air speed and time known, he can solve for new wind direction and velocity, new magnetic heading, true course, and ground speed to destination, or the desired point to turn back on course, it being understood that the map is in place on the plotting table. Thus, the magnetic heading is set at the index 28, and the true air speed is arranged under the center 11. Next, the course lock 25 is released, the plotting scale 38 is manipulated to azimuth and measure the track from the last fixed to the new fixed. Next, the operator locks course lock 25 and time and distance to ground speed are computed. Then, a wind identification mark is made over the concentric circle that indicates the computed ground speed, over the only drift angle lines 6 that are parallel to the parallel line 3 of the course indicator disc 1. This establishes the new wind, its direction and velocity read when placed over the course indicator scale line 5. The course lock 25 is released, the plotting scale 38 is manipulated to azimuth course from new fix to destination, the course lock 25 is locked, the heading lock 24 released, and the plotting scale and plotting table are rotated in unison in the required direction until the parallel line 3 of the course indicator disc 1 that is under the tail of the new wind vector is parallel to the only drift angle line 6 that it is possible to parallel. Next, the heading lock 24 is locked, and the operator reads and flies the new magnetic heading on the variation index 28. The true heading indicator 10 is read and the new true ground speed is read under the tail of the wind vector. The ground speed and distance (E. T. A.) is computed or the ground speed and distance to turning point on course. The progress on course is plotted along the plotting scale 38.

Also, a drift problem can be computed by computing the wind by flying two or more headings. Thus, with the true air speed, magnetic heading and drift angles known, the wind direction and velocity can be solved or computed. Thus, the heading lock 24 and the course lock 25 are released, the plotting table is rotated to read the magnetic heading and the variation index heading 28, the heading lock 24 is locked, and the plotting assembly is rotated to read the drift angle at the course indicator 8 in reference to the drift angle scale. The course lock 25 is locked, and the operator draws his line directly over the only drift angle line 6 that is parallel to the parallel line 3 of the course indicator paralleling disc 1. The heading lock 24 is released, and the plotting table 9 is turned onto the new magnetic heading. The heading lock 24 is locked, the course lock 25 is released, and the plotting scale is rotated to read drift angle. The course lock 25 is locked, and a line is drawn directly over the only drift angle line 6 that is parallel to the parallel line 3 of the course indicator paralleling disc 1. Also, the pilot can fly more headings if he wishes, and by plotting the drift readings in the same manner as above stated, the pilot can get a very accurate wind reading at intersections of the plotted lines.

As another example of a problem that can be solved, with the wind direction and velocity, and true course and ground speed known, the magnetic heading, true heading and air speed can be solved. It is to be understood that the chart is in place on the plotting table in this problem. First, the heading lock 25 and course lock 24 are released, the wind direction at the indicating point 8 is set, and then the wind velocity over the scale 5 is plotted away from point 8, set true course at heading indicator, the course lock 25 is locked and plotting table 9 manipulated in unison with the speed scale setting ground speed under the tail of the wind vector to the only drift angle line 6 that will parallel the line 3 of the course indicator paralleling disc 1 that is under the tail of the wind vector. The heading lock 24 is locked, and the true air speed is read under the center 11. The true heading at the heading index 10 is read, and the magnetic heading is read on the variation index 28.

By using the method and apparatus of the present invention, wind velocity problems can be accurately solved, and by applying these solutions to the chart in the same operation, a navigator can plot any radius of action or interception problem directly to the chart or to the surface of the plotting table, as desired.

Also, by applying the magnetic heading to the true air speed or ground speed and paralleling the only two lines that will parallel under the tail of the wind vector, then this instrument will instantly and automatically coordinate the plotting scale 38 to azimuth in true relation to the center line 46 of the plotting table 9. Thus, by placing any chart with the desired line of meridian parallel to the center line 46 of the plotting table 9, the plotting scale 38 can be moved to show and measure the true course from or to any desired point on the chart.

By rotating and manipulating the plotting table 9 and plotting scale 38 to azimuth and measure any two points on the chart any desired line of meridian is placed parallel to the line 46 of the plotting table 9, and by applying the known true air speed or true ground speed and paralleling the only two lines that will parallel under the tail of the known wind vector, this instrument will automatically and instantly give the magnetic heading and true heading to fly to make good the course. When any of the above problems are being applied, the plotting table 9 is always in a position so that the pilot sees his chart in the same relation as the earth under him, and he visualizes the earth, in its true relation to the forces acting upon him. The instrument can be built in any size, as for example, it may be small enough to be strapped to the leg of a pilot or may be mounted on a large table for aircraft plotting stations, base operations and the like. Further, transparent maps or charts may be used, and such charts or maps may be either square or in a circular form.

In the method of the present invention, the chart is placed with a selected line of meridian parallel to a center line identified as north and south on a rotatable table. This north and south center line is always in true relation to and in parallel to a north and south line of an indexed 360° compass rose. Also, it will be noted that there has been provided a combination chart and rotatable table and a rotatable plotting assembly which includes parallel lines and a sliding scale that is always parallel and coordinated in true respect to an indicator which is the center line of a group of parallel lines. The indicator reading true course or true track of course on the chart paralleled by the sliding scale or parallel lines on the plotting assembly is read at the indicator point on the compass rose. Further, there has been provided a method of controlling and coordinating a plotting table and plotting assembly to read true heading, magnetic heading or pilot true course or track from or to any chart placed on the plotting table.

The present invention is easy and accurate of operation and uses a group of parallel lines on a disc which are arranged parallel to a line that is identified from a group of radial lines by a plotted wind identification mark which is plotted in true relation to a compass rose, that is, in true relation to the north and south of a line of meridian of any chart or direction problem.

There is provided a joint between the base 2 and disc 45, and there is also a joint between the disc 31 and disc 1. The disc 45 is transparent so that the user can readily see therethrough, and the disc 45 also acts as a guide for the adjacent parts such as the base 2.

Referring to Figures 11 through 14 of the drawings, there is shown a modified computer which includes a rotatable compass rose 56, the computer of Figures 11 through 14 being designated generally by the numeral 55. A pair of arcuate members 57 and 58 are arranged on opposite sides of the compass rose 56, Figure 11, and a pair of spaced, parallel arms 59 serve to connect the members 57 and 58 together. The computer further includes a base 60, and slidably mounted between guide members 63 is a grid or speed card 61, Figure 12. A transparent disc 62 is interposed between the compass rose 56 and the speed card 61.

A spring lock 64 is provided for preventing accidental rotation of the compass rose 56.

When using the device shown in Figures 11 through 14, the air speed is always read under the center 65 and the ground speed is always read under the tail of the wind vector, while the wind is always plotted away from the indicator denoting direction, from the center along a scale to its velocity, in all problems whether they be from the chart to compass or compass to chart. The speed scale is provided with a central speed scale 66, while the transparent disc 62 is provided with a graduated center line 67, there being indicator points or arrow 68 arranged at each end of the line 67. By means of the assembly of Figures 11 through 14, certain conventional computers, such as the Dalton Model E6B or Ej can be converted to the method of the present invention.

What is claimed is:

In a navigation computing instrument, a base, a plotting table positioned above said base, a heading indicator scale graduated and indexed on the face of said base around the outer circumference of said plotting table, a guide member secured to the rear of said base, a speed scale slidably mounted in said guide member, a true plotting assembly positioned on top of said base and including a course indicating paralleling disc, a true plotting plate connected to said disc, a cross bar mounted on said plate, a sliding true plotting scale assembly positioned on said cross bar, a spring pressed lock connected to said plate for locking the plotting assembly to said plotting table, said plate and course indicating disc having parallel lines thereon, said plotting table embodying a transparent disc provided with a compass rose graduated to 360 degrees around its outer circumference, a plurality of spring map holding clips arranged on the face of the plotting table, said clips being arranged to provide a clear space between a map and the compass rose through which the course is read, and a mounting member secured to said base.

(References on following page)

References Cited in the file of this patent

UNITED STATES PATENTS

| | | |
|---|---|---|
| 1,917,278 | Weems | July 11, 1933 |
| 2,420,673 | Monrad | May 20, 1947 |
| 2,506,299 | Isom | May 2, 1950 |

FOREIGN PATENTS

| | | |
|---|---|---|
| 183,347 | Great Britain | July 27, 1922 |
| 358,835 | Great Britain | Oct. 15, 1931 |

OTHER REFERENCES

Page 167 of "Practical Air Navigation" by T. C. Lyons and comprising Civil Aeronautics Bulletin No. 24, published in 1945 by the U. S. Government Printing Office, Washington, D. C.